United States Patent
Shinagawa et al.

(10) Patent No.: US 7,412,947 B2
(45) Date of Patent: *Aug. 19, 2008

(54) INTERNAL COMBUSTION ENGINE SYSTEM WITH HYDROGEN GENERATION CAPABILITY

(75) Inventors: Tomohiro Shinagawa, Susono (JP); Takeshi Okumura, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/587,179

(22) PCT Filed: Mar. 15, 2005

(86) PCT No.: PCT/JP2005/005074

§ 371 (c)(1),
(2), (4) Date: Jul. 25, 2006

(87) PCT Pub. No.: WO2005/100766

PCT Pub. Date: Oct. 27, 2005

(65) Prior Publication Data

US 2007/0151527 A1    Jul. 5, 2007

(30) Foreign Application Priority Data

Apr. 12, 2004    (JP)    ............................. 2004-116603

(51) Int. Cl.
  *F02B 43/08*    (2006.01)
  *F01K 23/00*    (2006.01)
  *F01K 25/00*    (2006.01)
  *F01K 13/00*    (2006.01)
  *F01K 27/00*    (2006.01)
  *F02B 17/00*    (2006.01)

(52) U.S. Cl. ............................. 123/3; 123/295; 60/781; 60/645; 60/643; 60/670; 60/671

(58) Field of Classification Search ..................... 123/3, 123/295; 60/781, 645, 643, 670, 671; F01K 25/00, F01K 23/00, 13/00, 27/00; F02B 43/08, F02B 17/00

See application file for complete search history.

(56) References Cited

U.S. PATENT DOCUMENTS 5,178,118 A    1/1993    Nakamats (Continued)

FOREIGN PATENT DOCUMENTS

JP    A 7-63128    3/1995

(Continued)

*Primary Examiner*—Stephen K. Cronin
*Assistant Examiner*—Keith Coleman
(74) *Attorney, Agent, or Firm*—Oliff & Berridge, PLC

(57) ABSTRACT

A dehydrogenated fuel tank 32 which is replenished with an organic hydride-contained hydrogenated fuel and a gasoline tank 48 which is replenished with normal gasoline are provided. In order to separate the hydrogenated fuel into a hydrogen rich gas and dehydrogenation product, a dehydrogenation reactor 22 and a separator 40 are provided. The hydrogen rich gas flows into a hydrogen pipe 44 and is supplied into the intake pipe 12. A dehydrogenation product pipe 42 is provided with a flow separator 46. The dehydrogenation product is guided into the gasoline tank 48 until the mixed ratio of the dehydrogenation product reaches the maximum allowable ratio in the gasoline tank 48. Only if the ratio reaches the maximum allowable ratio, the dehydrogenation product is collected into a dehydrogenation product tank 50.

3 Claims, 2 Drawing Sheets

U.S. PATENT DOCUMENTS

| | | | |
|---|---|---|---|
| 6,655,324 B2 * | 12/2003 | Cohn et al. | 123/1 A |
| 7,089,907 B2 * | 8/2006 | Shinagawa et al. | 123/295 |
| 2003/0226349 A1 | 12/2003 | Klenk et al. | |
| 2004/0045514 A1 | 3/2004 | Qian et al. | |

FOREIGN PATENT DOCUMENTS

| | | |
|---|---|---|
| JP | A 2002-255503 | 9/2002 |
| JP | A 2003-343360 | 12/2003 |
| JP | A 2004-100501 | 4/2004 |

* cited by examiner

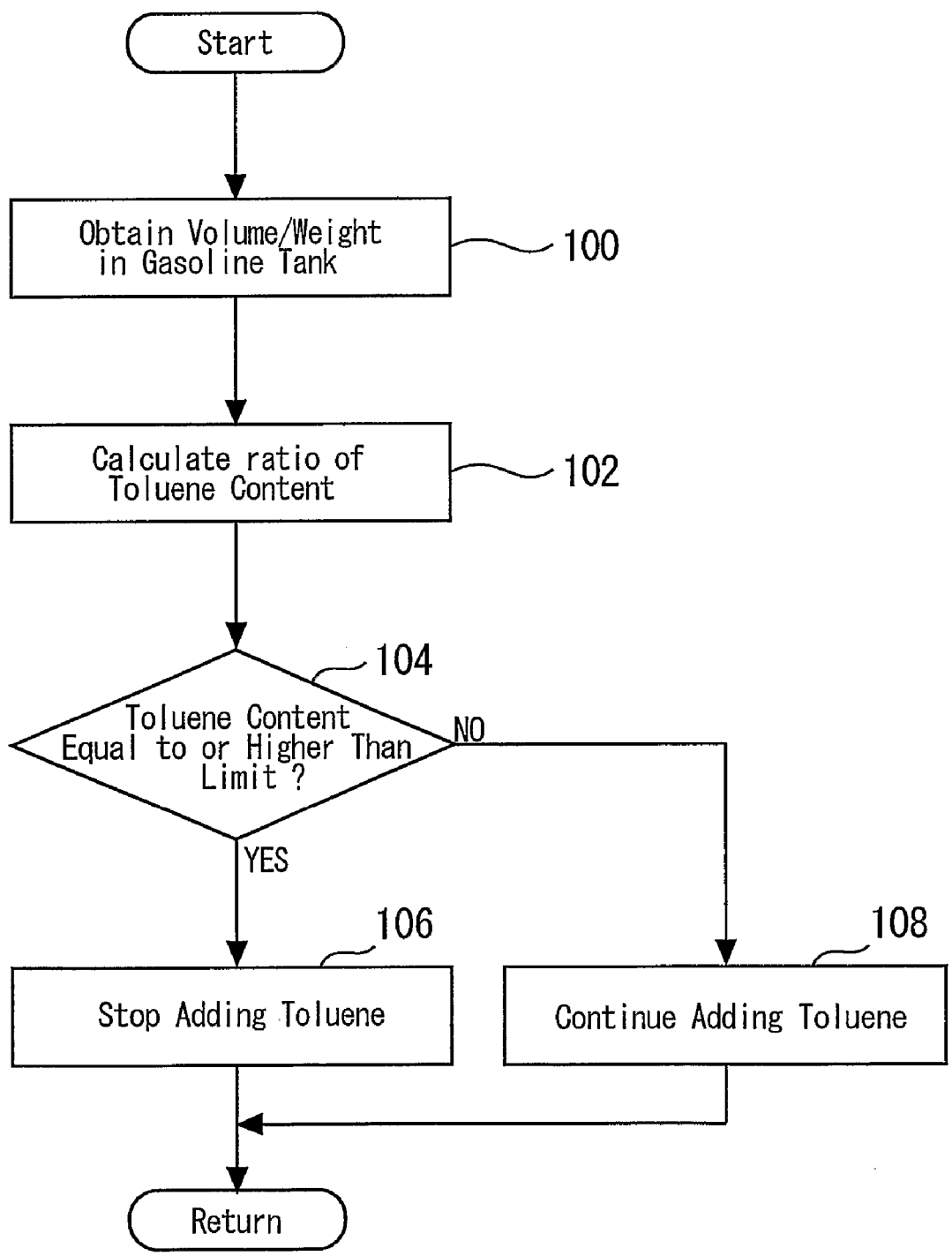

INTERNAL COMBUSTION ENGINE SYSTEM WITH HYDROGEN GENERATION CAPABILITY

TECHNICAL FIELD

The present invention relates to an internal combustion engine system with a hydrogen generation capability. In particular, the invention relates to a hydrogen generation capability-equipped internal combustion engine system which is run by using both hydrogenated fuel and normal gasoline.

BACKGROUND ART

As disclosed in, for example, Japanese Patent Laid-Open No. 2003-343360, internal combustion engine systems provided with hydrogen generation capability are known. Specifically, the system includes a mechanism to generate a hydrogen rich gas and dehydrogenation products such as naphthalene from a hydrogenated fuel containing organic hydrides such as Decalin as well as a hydrogen engine which runs using the generated hydrogen rich gas as fuel.

In the system disclosed in the above-mentioned publication, while the hydrogen engine is operating, the hydrogenated fuel is separated into a hydrogen rich gas and dehydrogenation products by utilizing the heat generated by the operation. Then, only the hydrogen rich gas is extracted and used as fuel. The remaining dehydrogenation products are collected into a recovery tank. The recovery tank has a discharge pipe through which the dehydrogenation products can be discharged to the outside.

As described above, this prior art system can generate by itself hydrogen for use as fuel. It is therefore possible to realize a hydrogen-fueled system without having to install a high pressure hydrogen tank or the like.

Including the above-mentioned document, the applicant is aware of the following documents as a related art of the present invention.

[Patent Document 1]
   Japanese Patent Laid-Open No. 2003-343360

[Patent Document 2]
   Japanese Patent Laid-Open No. 2002-255503

[Patent Document 3]
   Japanese Patent Laid-Open No. 7-63128

By the way, for an internal combustion engine to output large power, it is effective to supply both gasoline and hydrogen to the internal combustion engine. This function can be implemented by, for example, applying the above-mentioned prior art system to a gasoline-fueled ordinary internal combustion engine.

In the above-mentioned prior art system, however, dehydrogenation products which are by-products of generating hydrogen rich gas are discharged for disposal. Thus, if the system is simply applied to an ordinary internal combustion engine, dehydrogenation products will have to be discharged frequently, requiring the user to do troublesome maintenance/management operations.

DISCLOSURE OF INVENTION

The present invention has been made to solve the above-mentioned problem. It is an object of the present invention to provide a hydrogen generation capability-equipped internal combustion engine which can use both hydrogen rich gas and normal gasoline as fuel without requiring troublesome maintenance/management operations.

The above object is achieved by a first aspect of the present invention. The first aspect of the present invention relates to an internal combustion engine system with a capability to generate hydrogen. The system includes a hydrogenated fuel tank which is replenished with an organic hydride-contained hydrogenated fuel. The system also includes a gasoline tank which is replenished with a normal gasoline. A fuel separating unit is provided for separating the hydrogenated fuel into a hydrogen rich gas and a dehydrogenation product. A hydrogen rich gas consuming mechanism is provided for consuming the hydrogen rich gas. A dehydrogenation product mixing unit is provided for mixing the dehydrogenation product with the normal gasoline. Further, the system includes a fuel supplying unit by which a mixed fuel composed of the normal gasoline and the dehydrogenation product is supplied to an internal combustion engine.

The above object of the present invention is also achieved by a second aspect of the present invention. The second aspect of the present invention relates to the internal combustion engine system according to the first aspect. In this aspect, the dehydrogenation product mixing unit includes a dehydrogenation product guiding mechanism for guiding the dehydrogenation product into the gasoline tank, a mixed ratio detecting unit for detecting the mixed ratio of the dehydrogenation product in the gasoline tank, and a dehydrogenation product stopping unit for prohibiting the dehydrogenation product from flowing into the gasoline tank if the mixed ratio exceeds the maximum allowable mixed ratio.

The above object of the present invention is further achieved by a third aspect of the present invention. The third aspect of the present invention relates to the internal combustion engine system according to the second aspect of the present invention. In this aspect, a dehydrogenation product tank is further provided to pool the dehydrogenation product. The dehydrogenation product guiding unit includes a flow separator capable of implementing a first state in which the dehydrogenation product is guided into the gasoline tank and a second state in which the dehydrogenation product is guided into the dehydrogenation product tank. The dehydrogenation product stopping unit includes flow separator control unit which sets the flow separator to the second state if the mixed ratio exceeds the maximum allowable mixed ratio. The system further includes an alarming unit which if the amount of the dehydrogenation product pooled in the dehydrogenation product tank reaches the maximum allowable amount, issues an alarm about the condition.

According to a first aspect of the present invention, it is possible to generate a hydrogen rich gas and dehydrogenation product by separating a hydrogenated fuel. While the hydrogen rich gas is consumed, the dehydrogenation product can be mixed into a normal gasoline and supplied to the internal combustion engine as part of the mixed fuel. It is therefore possible to reduce the frequency of discharging the dehydrogenation product.

According to a second aspect of the present invention, it is possible to prohibit the dehydrogenation product from flowing into a gasoline tank if the mixed ratio of the dehydrogenation product in the gasoline tank exceeds the maximum allowable mixed ratio. If the mixed ratio of the dehydrogenation product rises excessively, the mixed fuel deteriorates in combustibility, making it impossible for the internal combustion engine to stably run. The present invention can prevent such a situation from occurring.

According to a third aspect of the present invention, it is possible to guide the dehydrogenation product into a dehydrogenation product tank if the mixed ratio of the dehydrogenation product exceeds the maximum allowable mixed ratio. Thus, it is possible to continue generating hydrogen rich gas without excessively raising the mixed ratio of the dehydrogenation produce in the mixed fuel. Further, in case the amount of the dehydrogenation product pooled in the tank reaches the maximum allowable amount, it is possible to issue an alarm to urge its disposal (discharge).

BRIEF DESCRIPTION OF DRAWINGS

FIG. 2 is a flowchart of a routine which is executed in the first embodiment of the present invention.

BEST MODE FOR CARRYING OUT THE INVENTION

First Embodiment

Configuration of First Embodiment

Figure 1:
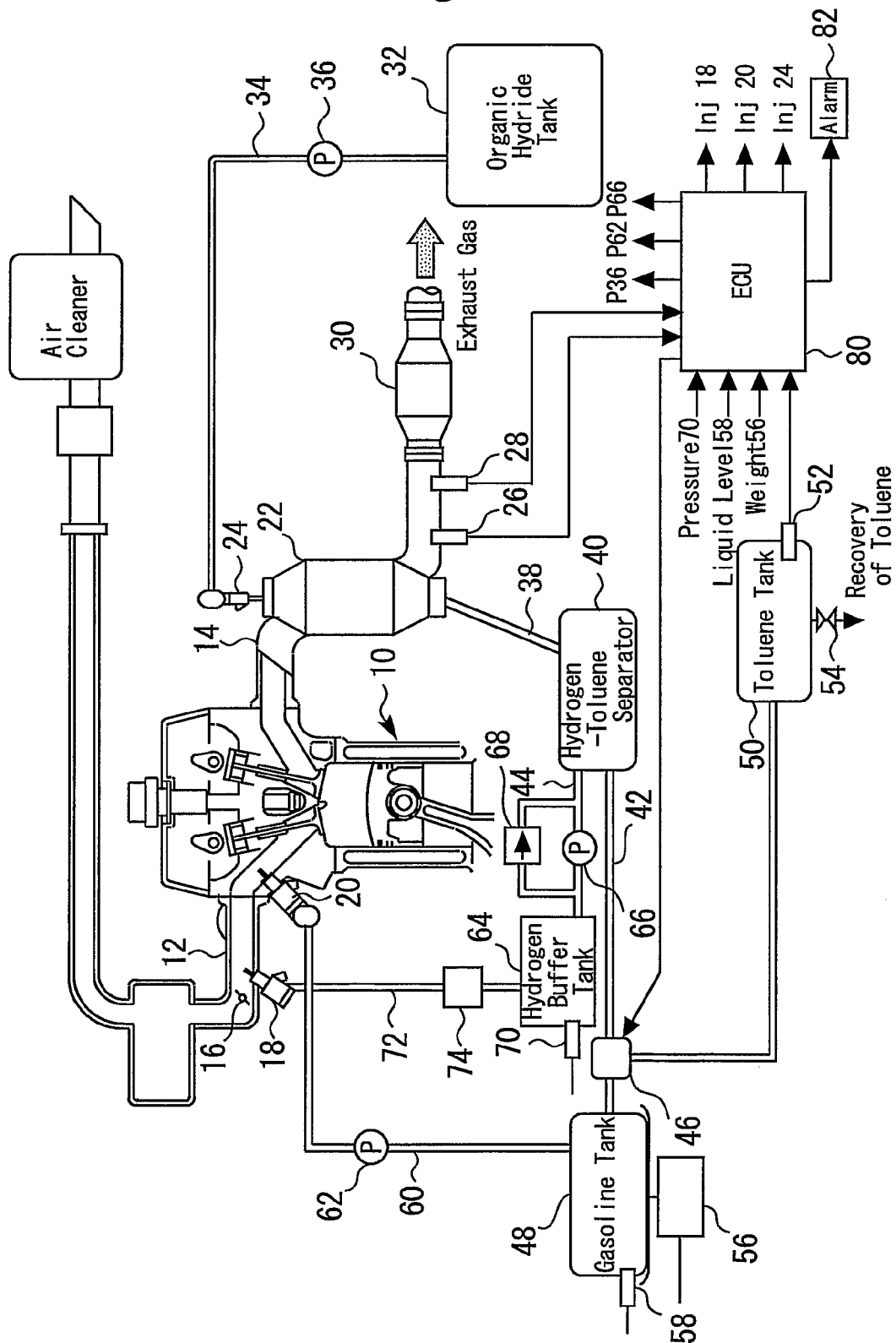
FIG. 1 is a diagram for explaining the configuration of a system according to a first embodiment of the present invention.

FIG. 1 is provided to explain the configuration of an internal combustion engine system according to a first embodiment of the present invention. This system has an internal combustion engine 10. An intake pipe 12 and an exhaust pipe 14 are communicated with the internal combustion engine 10.

The intake pipe 12 is provided with a throttle valve 16 to control the amount of air to be suctioned. Downstream of the throttle vale 16, a hydrogen injector 18 is disposed. In addition, a gasoline injector 20 is disposed at the intake port of the internal combustion engine 10.

The hydrogen injector 18, as described later, is supplied with hydrogen rich gas at a certain pressure. Receiving a drive signal from the outside, the hydrogen injector 18 opens the valve to inject hydrogen rich gas into the intake pipe 12. The amount of hydrogen rich gas to be injected is in accordance with the valve opening duration. Although the hydrogen injector 18 is disposed at the intake pipe 12 in the system of FIG. 1, the configuration is not limited to this arrangement. Specifically, the hydrogen injector 18 may also be mounted on the main body of the internal combustion engine so as to inject hydrogen into the cylinder.

The gasoline injector 20, as described later, is supplied with gasoline (strictly, mixed fuel) at a certain pressure. Receiving a drive signal from the outside, the gasoline injector 20 opens its valve to inject gasoline into the intake port 12. The amount of gasoline to be injected is in accordance with the valve opening duration.

A dehydrogenation reactor 22 is attached to the exhaust pipe 14. In addition, a hydrogenated fuel injector 24 is mounted to the top of the dehydrogenation reactor 22. The hydrogenated fuel injector 24, as described later, is supplied with organic hydride-contained hydrogenated fuel at a certain pressure.

Here, "organic hydrides" mean Decalin, cyclohexane and other hydrocarbon components which show dehydrogenation at temperatures around 300° C. Further, for convenience of explanation, it is assumed that a fuel which contains only methylcyclohexane $C_7H_{14}$, that is, a fuel which is substantially 100% composed of methylcyclohexane is used as "hydrogenated fuel" in this embodiment.

Receiving a drive signal from the outside, the hydrogenated fuel injector 24 opens its valve to inject hydrogenated fuel into the dehydrogenation reactor 22. The amount of hydrogenated fuel to be injected is in accordance with the valve opening duration. The dehydrogenation reactor 22 can separate the thus supplied hydrogenated fuel into a hydrogen rich gas and dehydrogenation product by utilizing the heat emitted from the exhaust pipe 14, and sending them out from the bottom.

In this embodiment, as mentioned above, hydrogenated fuel is composed 100% of methylcyclohexane $C_7H_{14}$. Methylcyclohexane $C_7H_{14}$ is separated into hydrogen $H_2$ and toluene $C_7H_8$ through a dehydrogenation reaction as below:

$$C_7H_{14} \rightarrow C_7H_8 + 3H_2 \tag{1}$$

Thus, in this embodiment, if hydrogenated fuel is injected from the hydrogenated fuel injector 24, hydrogen rich gas and toluene $C_7H_8$ are sent out from the bottom of the dehydrogenation reactor 22.

An $O_2$ sensor 26 and a NOx sensor 28 are mounted in the exhaust pipe 14 downstream of the dehydrogenation reactor 22. Based on the amount of oxygen in the exhaust gas, the $O_2$ sensor 26 provides an output which represents the exhaust air-fuel ratio. In addition, the NOx sensor 28 provides an output which represents the NOx concentration in the exhaust gas. A catalyst 30 is disposed downstream of these sensors 26 and 28 to purify the exhaust gas.

The system of the present embodiment includes a hydrogenated fuel tank 32. The hydrogenated fuel tank 32 is a tank which should be refueled with hydrogenated fuel and pools the hydrogenated fuel. In other words, the system of the present embodiment requires filling the hydrogenated fuel tank 32 with the above-mentioned hydrogenated fuel, namely, 100% methylcyclohexane.

A hydrogenated fuel supply pipe 34 is connected with the hydrogenated fuel tank 32. The hydrogenated fuel supply pipe 34 is provided with a pump 36 halfway in its route and communicated with the hydrogenated fuel injector 24 at its end. During operation of the internal combustion engine, hydrogenated fuel is pumped up from the hydrogenated fuel tank 32 and supplied to the hydrogenated fuel injector 24 at a certain pressure.

As mentioned above, receiving a drive signal from the outside, the hydrogenated fuel injector 24 can inject hydrogenated fuel into the dehydrogenation reactor 22 from its top. The dehydrogenation reactor 22, as mentioned above, separates the hydrogenated fuel into a hydrogen rich gas and a dehydrogenation product, namely, hydrogen rich gas and toluene $C_7H_8$.

The bottom of the dehydrogenation reactor 22 communicates with a separator 40 via a pipe 38. The separator 40 has the capability to separate the high temperature hydrogen rich gas and dehydrogenation product (toluene) supplied from the dehydrogenation reactor 22 by cooling them. In the bottom of the separator 40, there is a liquid reservoir space to pool the cooled and thereby liquefied dehydrogenation product therein. Above this reservoir space, there is a vapor reservoir space to pool the hydrogen rich gas still in vapor phase. A dehydrogenation product pipe 42 communicated with the separator 40 gives communication to the liquid reservoir space. Likewise, a hydrogen pipe 44 gives communication to the vapor reservoir space.

The dehydrogenation product pipe 42 is communicated with a flow separator 46. The flow separator 46 is connected to a gasoline tank 48 and a dehydrogenation product tank 50. Receiving a drive signal from the outside, the flow separator 46 can switch its state between a first state in which the dehydrogenation product pipe 42 communicates with the dehydrogenation product tank 50 and a second state in which the hydrogenation product pipe 42 communicates with the gasoline tank 48. In this system embodiment, it is therefore possible to supply the dehydrogenation product into the gasoline tank 48 by setting the flow separator 46 to the first state. It is also possible to guide the dehydrogenation product into the dehydrogenation product tank 50 by setting the flow separator 46 to the second state.

The dehydrogenation product tank 50 includes a liquid level sensor 52 and a discharge valve 54. The liquid level sensor 52 provides an output which reflects the amount of the dehydrogenation product collected in the dehydrogenation product tank 50. The discharge valve 54 is a valve mechanism by which dehydrogenation product pooled in the dehydrogenation product tank 50 is discharged to the outside.

The gasoline tank 48 is a tank which should be replenished with normal gasoline which contains organic hydrides such as cyclohexane and Decalin at some 40%. That is, the system of the present embodiment is designed so that the hydrogenated fuel tank 32 is replenished with hydrogenated fuel and the gasoline tank 48 is filled with normal gasoline.

When the flow separator 46 is in the first state, the dehydrogenation product, namely, toluene generated in the separator 40, is supplied into the gasoline tank. In the gasoline tank 48, a mixed fuel composed of the replenished normal gasoline and the dehydrogenation product introduced from the flow separator 46 is therefore pooled.

In this embodiment, the gasoline tank 48 includes a weight sensor 56 and a level sensor 58. The weight sensor 56 provides an output which reflects the amount of the mixed fuel pooled in the gasoline tank 50. Meanwhile, the level sensor 58 provides an output which reflects the volume of the mixed fuel there. The specific gravity of the normal gasoline is different from that of the dehydrogenation product. If both weight and volume of the mixed fuel pooled there are known, it is therefore possible to calculate the ratio of the normal gasoline content and the dehydrogenation product content from these values. In the system of the present embodiment, the ratio of the dehydrogenation product content in the mixed fuel pooled in the gasoline tank 48 can be detected based on the output of the weight sensor 56 and that of the level sensor 58.

A gasoline pipe 60 is communicated with the gasoline tank 48. The gasoline pipe 60 is provided with a pump 62 halfway in its route and communicated with the gasoline injector 20 at its end. During operation of the internal combustion engine, the mixed fuel stored in the gasoline tank 48 is pumped up by the pump 62 at a certain pressure and supplied to the gasoline injector 20.

The hydrogen pipe 44 is communicated with a hydrogen buffer tank 64. The hydrogen pipe 44 is provided with a pump 66 and a relief valve 68. From the separator 40, hydrogen rich gas is pumped into the hydrogen buffer tank 64 by the pump 66. The relief valve 68 prevents the delivery pressure of the pump 66 from rising excessively. With the pump 66 and the relief valve 68, hydrogen rich gas can be supplied into the hydrogen buffer tank 64 without causing the internal pressure to rise excessively.

The hydrogen buffer tank 64 includes a pressure sensor 70. The pressure sensor 70 provides an output which reflects the internal pressure of the hydrogen buffer tank 64. According to the output of the pressure sensor 70, it is possible to estimate the amount of hydrogen rich gas pooled in the hydrogen buffer tank 64.

A hydrogen supply pipe 72 is communicated with the hydrogen buffer tank 64. The hydrogen supply pipe 72 is provided with a regulator 74 halfway in its route and communicated with the hydrogen injector 18 at its end. In this configuration, hydrogen rich gas is supplied to the hydrogen injector 18 at a pressure regulated by the regulator 74 as long as hydrogen rich gas is pooled enough in the hydrogen buffer tank 64.

The system in the present embodiment includes an ECU 80. The outputs of various sensors including the above-mentioned $O_2$ sensor 26, NOx sensor 28, liquid level sensor 52, liquid weight sensor 56, liquid level sensor 58 and pressure sensor 70 are connected to the ECU 80. In addition, the actuators of the above-mentioned flow separator 46, pumps 36, 62 and 66 and injectors 18, 20 and 24, an alarm lamp 82 and others are connected to the ECU 80. By performing routine processing based on the sensor outputs, the ECU 80 can appropriately drive these actuators and turn on the alarm lamp 82 to notify that the amount of the dehydrogenation produce pooled has exceeded the upper limit if so.

Summary of Operation of First Embodiment

When the internal combustion engine 10 starts, the ECU 80 begins to calculate the amounts of hydrogen rich gas and gasoline (mixed fuel) to be supplied to the internal combustion engine 10. These targeted values are calculated based on the operating condition according to predefined rule. During operation of the internal combustion engine 10, the hydrogen injector 18 and the gasoline injector 20 are driven so as to realize these target values. Consequently, the hydrogen rich gas pooled in the hydrogen buffer tank 64 and the mixed fuel pooled in the gasoline tank 48 are appropriately injected into the intake pipe 12 and the intake port, respectively.

If both hydrogen and gasoline are supplied to the internal combustion engine 10 at the same time, it is possible to obtain greatly larger power than when only hydrogen is used as the fuel. In addition, since this greatly raises the upper limit of the air excess ratio at which stable combustion can be assured as compared with a case in which only gasoline is used as the fuel, it is possible to remarkably improve the fuel efficiency and emission performance. Thus, the system of the present embodiment can realize an internal combustion engine 10 superior in terms of fuel efficiency, output power performance and emission.

The dehydrogenation reactor 22 in this system embodiment becomes able to separate the hydrogenated fuel to a hydrogen rich gas and dehydrogenation product when its internal temperature is raised to 300° C. or so. After the internal combustion engine 10 is started, the ECU 80 judges whether the dehydrogenation reactor 22 has become ready to perform the separating process based on the temperature of the internal combustion engine 10. Then, if it is judged that the process can be performed, the ECU 80 allows the hydrogenated fuel injector 24 to start injecting an appropriate amount of hydrogenated fuel.

After the hydrogenated fuel begins to be injected, a high temperature gas of a mixture of a hydrogen rich gas and dehydrogenation product (toluene) begins to flow out from the bottom of the dehydrogenation reactor 22. This high temperature gas is cooled in the separator 40, thereby the dehydrogenated product begins to flow in the dehydrogenation product pipe 42 and the hydrogen rich gas begins to flow in the hydrogen pipe 44, respectively.

The hydrogen rich gas in the hydrogen pipe 44 flows into the hydrogen buffer tank 64 under pressure by the pump 66. Normally, the ECU 80 controls the generative amount of hydrogen rich gas, i.e., controls the amount of hydrogenated fuel to be injected from the hydrogenated fuel injector 24 so that the internal pressure of the hydrogen buffer tank 64 is kept within a desired range. The system of the present embodiment can therefore reliably run the internal combustion engine 10 using the hydrogen rich gas and the mixed fuel, while always keeping an appropriate amount of hydrogen rich gas in the hydrogen buffer tank 64.

Dehydrogenation product, namely, toluene flows in the dehydrogenation product pipe 42 and is guided into the gasoline tank 48 or the dehydrogenation product tank 50 depending on the state of the flow separator 46. Dehydrogenation products such as toluene can not solely be used as fuel for the internal combustion engine 10 since their octane numbers are excessively high. However, a dehydrogenation product is inevitably generated as a by-product in the system of the present embodiment since hydrogen is generated by decomposing a hydrogenated fuel.

One considerable method for treating such a dehydrogenated product is simply collecting the product into a recovery tank, and discharging the dehydrogenated product to the outside from the recovery tank when some volume is accumulated. In this method, however, it is necessary to either frequently discharge the dehydrogenated product or use a larger recovery tank in order to reduce the frequency.

Alternatively, although toluene and other dehydrogenation products can not solely be used as fuel for the internal combustion engine 10, they may be mixed into a normal gasoline as octane boosters. That is, since dehydrogenation products are stable in composition, adding a dehydrogenation product to normal gasoline at an appropriate proportion can boost the octane number without deteriorating the combustibility of the gasoline. Consequently, such a mixed fuel can improve the output power of the internal combustion engine 10 since the possibility of knocking is lower than when normal gasoline is solely used.

Further, in the system of the present embodiment, as already described, the ratio of the dehydrogenation product content in the mixed fuel pooled in the gasoline tank 48 can be detected based on the output of the weight sensor 56 and that of the liquid level sensor 58. Thus, the system of the present embodiment is configured so that the dehydrogenation product is guided into the gasoline tank 48 by setting the flow separator 46 to the first state until the above mentioned ratio reaches a predetermined upper limit and the dehydrogenation product is collected into the dehydrogenation product recovery tank 50 by setting the flow separator to the second state only while the ratio is higher than the upper limit.

Practical Processing in the Second Embodiment

FIG. 2 is the flowchart of a routine which is executed by the ECU 80 to implement the above-mentioned functions in this embodiment. In the routine shown in FIG. 2, firstly, the volume and weight of the mixed fuel in the gasoline tank 48 are obtained based on the outputs of the weight sensor 56 and liquid level sensor 58 (step 100).

Then, based on these obtained results, the ratio of the dehydrogenated content or toluene content in the mixed fuel is calculated (step 102). Then, it is judged whether the calculated ratio is equal to or higher than a predetermined threshold (step 104). This predetermined threshold is the upper limit of the toluene content range in which the internal combustion engine 10 shows good combustion.

If the ratio of the toluene content is judged equal to or larger than the predetermined threshold in the above-mentioned step 104, it is considered that the mixed fuel may loose its adequateness as fuel if the dehydrogenation product (toluene) is further supplied into the gasoline tank 48. In this case, the flow separator 46 is set to the second state so as to prevent the dehydrogenation product from flowing into the gasoline tank 48 (step 106).

On the other hand, if the toluene content is judged smaller than the predetermined threshold in the above-mentioned step 104, it is considered that further supply of the dehydrogenation product (toluene) into the gasoline tank 48 is allowed. In this case, the flow separator 46 is set to the first state to allow further supply (step 108).

According to the processing mentioned above, the hydrogenated fuel can be separated into a hydrogen rich gas and dehydrogenation product during operation of the internal combustion engine 10 so as to compensate for the amount of hydrogen rich gas consumed. As well, some of the generated dehydrogenation product can be consumed as part of the mixed fuel without deteriorating the adequacy of the mixed fuel as fuel. Therefore, as compared with a system where a normal gasoline is directly injected from the gasoline injector 20, the system of the present embodiment can improve the output power performance of the internal combustion engine 10 and, further, lighten the system maintenance/management burden by reducing the frequency of discharging the dehydrogenation product.

In addition, as described above, if the amount of the dehydrogenation product collected in the dehydrogenation product tank 50 exceeds the upper storage limit, this system embodiment can turn on the alarm lamp 82 to urge the system user to discharge the dehydrogenation product. According to the system of the present embodiment, it is therefore possible to realize an easy-to-use dual-fueled internal combustion engine 10.

Note that although it is assumed in the aforementioned first embodiment that the fuel used as the hydrogenated fuel contains 100% of an organic hydride, the present invention is not limited to this. Although the higher the ratio of the organic hydride content in the hydrogenated fuel, the more preferable for generating hydrogen efficiently, the ratio is not necessarily limited to 100%. The ratio of the organic hydride content inof the hydrogenated fuel is only required to be higher than that of normal gasoline.

Also note that although it is assumed in the aforementioned first embodiment that the hydrogen rich gas generated by decomposing the hydrogenated fuel is consumed by the internal combustion engine 10 as fuel, the hydrogen gas may also be consumed for other purposes. Namely, the hydrogen rich gas generated together with the dehydrogenation product may also be added to the exhaust gas of the internal combustion engine 10 in order to improve the emission. Further, the gas may be consumed by not only the internal combustion engine 10 but also other different devices (auxiliary hydrogen engine, fuel cell system and the like).

In addition, although it is assumed in the aforementioned first embodiment that the dehydrogenation product is mixed with normal gasoline in the gasoline tank 48, the mixing place is not limited to the gasoline tank 48. That is, the dehydrogenation product may be mixed with the normal gasoline in some place of the gasoline supply pipe before the gasoline injector 20.

Further, although it is assumed in the aforementioned first embodiment that if the amount of the dehydrogenation produce pooled reaches the upper limit, the alarm lamp 82 is used to notify of it, the alarming means is not limited to a lamp. For example, alarming may also be done using an alarm buzzer, voice guidance or the like.

It should be noted that the dehydrogenation reactor 22 and the separator 40 in the aforementioned first embodiment correspond to "fuel separating unit" in the first aspect of the present invention. Likewise, the internal combustion engine 10 corresponds to "hydrogen rich gas consuming mechanism" and the gasoline supply pipe 60, the pump 62 and the gasoline injector 20 correspond to "fuel supplying unit". In addition, "dehydrogenation product mixing unit" in the first aspect of the present invention is implemented by the ECU 80 which sets the flow separator 46 to the first state by executing step 108 as aforementioned.

Also it should be noted that in the aforementioned first embodiment, the flow separator 46 corresponds to "dehydrogenation product guiding mechanism" in the second aspect of the present invention. In addition, "mixed ratio detecting unit" in the second aspect of the present invention is implemented by the ECU 80 which executes steps 100 and 102 as aforementioned. Likewise, "dehydrogenation product stopping unit" in the second aspect of the present invention is implemented by the ECU 80 which sets the flow separator 46 to the second state by executing step 108 as aforementioned.

Also it should be noted that in the aforementioned first embodiment, "flow separator control means" in the third aspect of the present invention is implemented by the ECU 80 which sets the flow separator 46 to the second state by executing step 106 as mentioned above. Likewise, "alarming unit" in the third aspect of the present invention is implemented by the ECU 80 which turns on the alarm lamp 82 if the amount of the dehydrogenation product pooled in the dehydrogenation product tank 50 reaches the maximum allowable amount.

The invention claimed is:

1. An internal combustion engine system with a capability to generate hydrogen, comprising:
   a hydrogenated fuel tank which is replenished with an organic hydride-contained hydrogenated fuel;
   a gasoline tank which is replenished with a normal gasoline;
   fuel separating means for separating the hydrogenated fuel into a hydrogen rich gas and a dehydrogenation product;
   hydrogen rich gas consuming means for consuming the hydrogen rich gas;
   dehydrogenation product mixing means for mixing the dehydrogenation product with the normal gasoline; and
   fuel supplying means by which a mixed fuel composed of the normal gasoline and the dehydrogenation product is supplied to an internal combustion engine.

2. The internal combustion engine system according to claim 1, wherein the dehydrogenation product mixing means includes:
   dehydrogenation product guiding means for guiding the dehydrogenation product into the gasoline tank;
   mixed ratio detecting means for detecting the mixed ratio of the dehydrogenation product in the gasoline tank; and
   dehydrogenation product stopping means for prohibiting the dehydrogenation product from flowing into the gasoline tank if the mixed ratio exceeds the maximum allowable mixed ratio.

3. The internal combustion engine system according to claim 2, wherein:
   a dehydrogenation product tank to pool the dehydrogenation product is provided;
   the dehydrogenation product guiding means includes a flow separator capable of implementing a first state in which the dehydrogenation product is guided into the gasoline tank and a second state in which the dehydrogenation product is guided into the dehydrogenation product tank;
   the dehydrogenation product stopping means includes flow separator control means which sets the flow separator to the second state if the mixed ratio exceeds the maximum allowable mixed ratio; and
   there is provided alarming means which if the amount of the dehydrogenation product pooled in the dehydrogenation product tank reaches the maximum allowable amount, issues an alarm about the condition.

* * * * *